(12) United States Patent
Uchida et al.

(10) Patent No.: US 8,896,171 B2
(45) Date of Patent: Nov. 25, 2014

(54) MOTOR DRIVE APPARATUS HAVING A SIMPLIFIED ASSEMBLING STRUCTURE

(75) Inventors: Takayuki Uchida, Toyota (JP);
Hiroyuki Kawata, Chiryu (JP);
Yasuyoshi Toda, Toyohashi (JP)

(73) Assignee: Denso Corporation, Kariya (JP)

( * ) Notice: Subject to any disclaimer, the term of this patent is extended or adjusted under 35 U.S.C. 154(b) by 167 days.

(21) Appl. No.: 13/462,862

(22) Filed: May 3, 2012

(65) Prior Publication Data
US 2012/0286602 A1    Nov. 15, 2012

(30) Foreign Application Priority Data
May 13, 2011    (JP) .................. 2011-108803

(51) Int. Cl.
*H02K 5/22*    (2006.01)
*H02K 11/00*    (2006.01)

(52) U.S. Cl.
CPC ............ *H02K 11/0073* (2013.01); *H02K 5/225* (2013.01)
USPC ......................................................... 310/71

(58) Field of Classification Search
CPC .................................. H02K 5/22; H02K 5/225
USPC ......................................................... 310/71
See application file for complete search history.

(56) References Cited

U.S. PATENT DOCUMENTS

| | | | |
|---|---|---|---|
| 7,081,691 B2 | 7/2006 | Kawata | |
| 2003/0127921 A1* | 7/2003 | Akutsu et al. | 310/68 R |
| 2003/0200761 A1* | 10/2003 | Funahashi et al. | 62/228.4 |
| 2003/0206392 A1* | 11/2003 | Kawata | 361/631 |
| 2006/0075848 A1 | 4/2006 | Suzuki et al. | |
| 2008/0219867 A1* | 9/2008 | Sakata | 310/71 |

FOREIGN PATENT DOCUMENTS

| | | |
|---|---|---|
| JP | 04-033558 | 2/1992 |
| JP | 06-030543 | 2/1994 |
| JP | 10-234158 | 9/1998 |
| JP | 11-195678 | 7/1999 |
| JP | 2005-304203 | 10/2005 |

(Continued)

OTHER PUBLICATIONS

Machine translation of JP2006-261100 (Sep. 2006).*

(Continued)

*Primary Examiner* — Michael Andrews
(74) *Attorney, Agent, or Firm* — Nixon & Vanderhye P.C.

(57) ABSTRACT

In an ECU attached to a motor assembly, inverter FETs, which generate outputs for driving a motor, are electrically connected to a substrate. A plurality of screw holes is formed in a heat sink thereby to fix the substrate. A resin member is provided between the heat sink and the substrate and has a plurality of motor terminals and a resin mold, which integrally fix the motor terminals by molding the motor terminals. The motor terminal has an embedded part, a L-shaped substrate-side exposed part and a motor-side exposed side including a curbed part. The resin member and the substrate are tightened together and fixed to the heat sink.

12 Claims, 10 Drawing Sheets

(56) References Cited

FOREIGN PATENT DOCUMENTS

| | | | |
|---|---|---|---|
| JP | 2006-166599 | 6/2006 | |
| JP | 2006-261100 | 9/2006 | |
| JP | 2006261100 A * | 9/2006 | ............... H01B 5/02 |
| JP | 3-884450 | 2/2007 | |
| JP | 2008-022653 | 1/2008 | |
| JP | 4-252486 | 4/2009 | |
| JP | 2012-029516 | 2/2012 | |
| WO | WO 2008/090754 | 7/2008 | |
| WO | WO 2008/126715 | 10/2008 | |
| WO | WO 2010/007672 | 1/2010 | |
| WO | WO 2010/150530 | 12/2010 | |

OTHER PUBLICATIONS

Office Action (3 pages) dated Apr. 9, 2013, issued in corresponding Japanese Application No. 2011-108802 and English translation (4 pages).

Office Action (2 pages) dated May 14, 2013, issued in corresponding Japanese Application No. 2011-108804 and English translation (2 pages).

United States Office Action issued for U.S. Appl. No. 13/462,883, dated Apr. 2, 2014.

U.S. Appl. No. 13/462,873 of Tsuboi, filed May 3, 2012.

U.S. Appl. No. 13/462,883 of Miyaki, filed May 3, 2012.

* cited by examiner

MOTOR DRIVE APPARATUS HAVING A SIMPLIFIED ASSEMBLING STRUCTURE

CROSS REFERENCE TO RELATED APPLICATION

This application is based on and incorporates herein by reference Japanese patent application No. 2011-108803 filed on May 13, 2011.

TECHNICAL FIELD

The present disclosure relates to a motor drive apparatus, which drives a motor.

BACKGROUND

A conventional electric power steering system includes a motor and an electronic control unit (ECU).

For example, according to an electric power steering system disclosed in JP 2005-304203A (JP 4252486), a motor and an ECU are electrically connected to each other by using a first motor terminal welded to a substrate and a second motor terminal molded in a resin member. The first motor terminal is electrically connected to a coil terminal of the motor together with the second motor terminal via a through guide hole provided in the resin member. However, not only the resin member need be fixed to a housing separately but also the resin member need be positioned in correspondence to the position of the substrate. Fixing the resin member to the housing hence requires complicated work.

SUMMARY

It is therefore an object to provide a motor drive apparatus, which can be assembled simply.

A motor drive apparatus comprises a substrate, a fixed member, a resin member. To the substrate, power elements are electrically connected to generate outputs for driving the motor. The fixed member has a plurality of screw holes for fixing the substrate. The resin member is provided between the fixed member and the substrate and has a plurality of motor terminals and a resin mold. The motor terminals electrically connect the motor and the substrate, and the resin mold integrally fixes the motor terminals by molding an intermediate part of each of the motor terminals. Each of the motor terminals has an embedded part molded in the resin member, a substrate-side exposed part exposed to a substrate side and a motor-side exposed part exposed to a motor side. The resin member and the substrate have through holes in correspondence to the screw holes of the fixed member and are tightened together to be fixed to the fixed member.

BRIEF DESCRIPTION OF THE DRAWINGS

The above and other objects, features and advantages will become more apparent from the following detailed description made with reference to the accompanying drawings. In the drawings.

DESCRIPTION OF EMBODIMENT

Embodiment

A motor drive apparatus according to one embodiment is implemented in an electric power steering system, which assists a steering operation of a vehicle.

Figure 1:
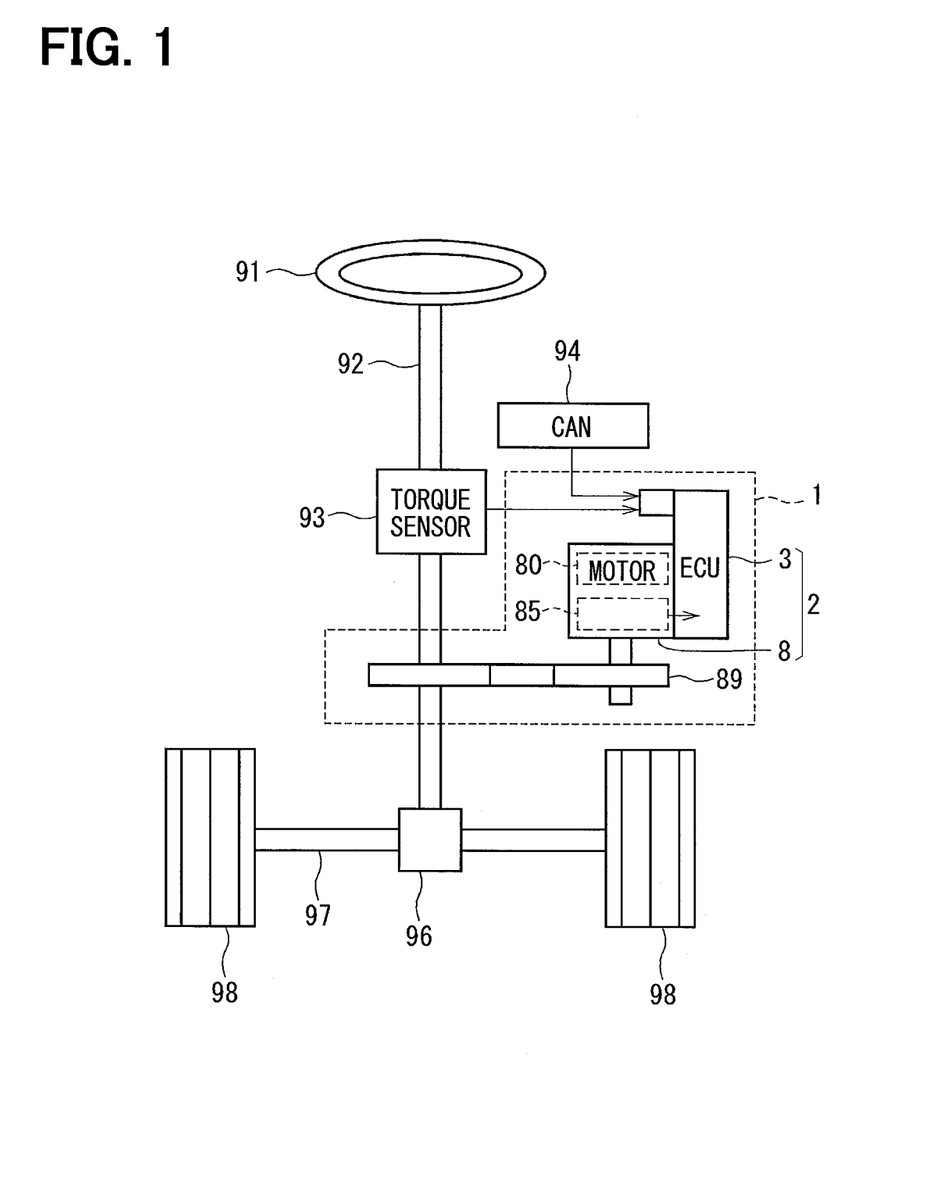
FIG. 1 is a schematic diagram of an electric power steering system, which implements a motor drive apparatus according to one embodiment.

As shown in FIG. 1, an electric power steering system 1 is provided in a power steering system to electrically assist a steering operation of a steering wheel 91. A torque sensor 93 is provided on a steering shaft 92 coupled to the steering wheel 91. The torque sensor 93 is for detecting a steering torque. A pinion gear 96 is provided at the top end of the steering shaft 92 and engaged with a rack shaft 97. A pair of tire wheels 98 is coupled rotatably to both ends of the rack shaft 97 through tie rods and the like. The rotary motion of the steering shaft 92 is converted to a linear motion of the rack shaft 97 by the pinion gear 96. The pair of tire wheels 98 is steered in correspondence to the linear motion of the rack shaft 97.

The electric power steering system 1 includes a motor unit 2 and a reduction gear 89. The motor unit 2 generates a steering assist torque. The reduction gear 89 reduces forward and reverse rotation of the motor unit 2 and transfers the rotation to the steering shaft 92. The electric power steering system 1 generates the steering assist torque and transfers the assist torque to the steering shaft 92 for assisting the steering of the steering wheel 91.

The motor unit 2 includes a motor assembly 8 and an electronic control unit (ECU) 3. The motor assembly 8 includes a motor 80 and a rotation angle sensor 85. The motor 80 is a three-phase brushless motor, which is formed of a stator, a rotor and the like. The stator is wound with coils. The rotor is rotatable in association with a rotating magnetic field generated by energization of the coils. The rotation angle sensor 85, which is for example a resolver, detects a rotation angle of the rotor. The ECU 3 is inputted with a steering torque signal outputted from the torque sensor 93, a vehicle speed signal of a controller area network (CAN) and the like through a CAN interface circuit.

Figure 2:
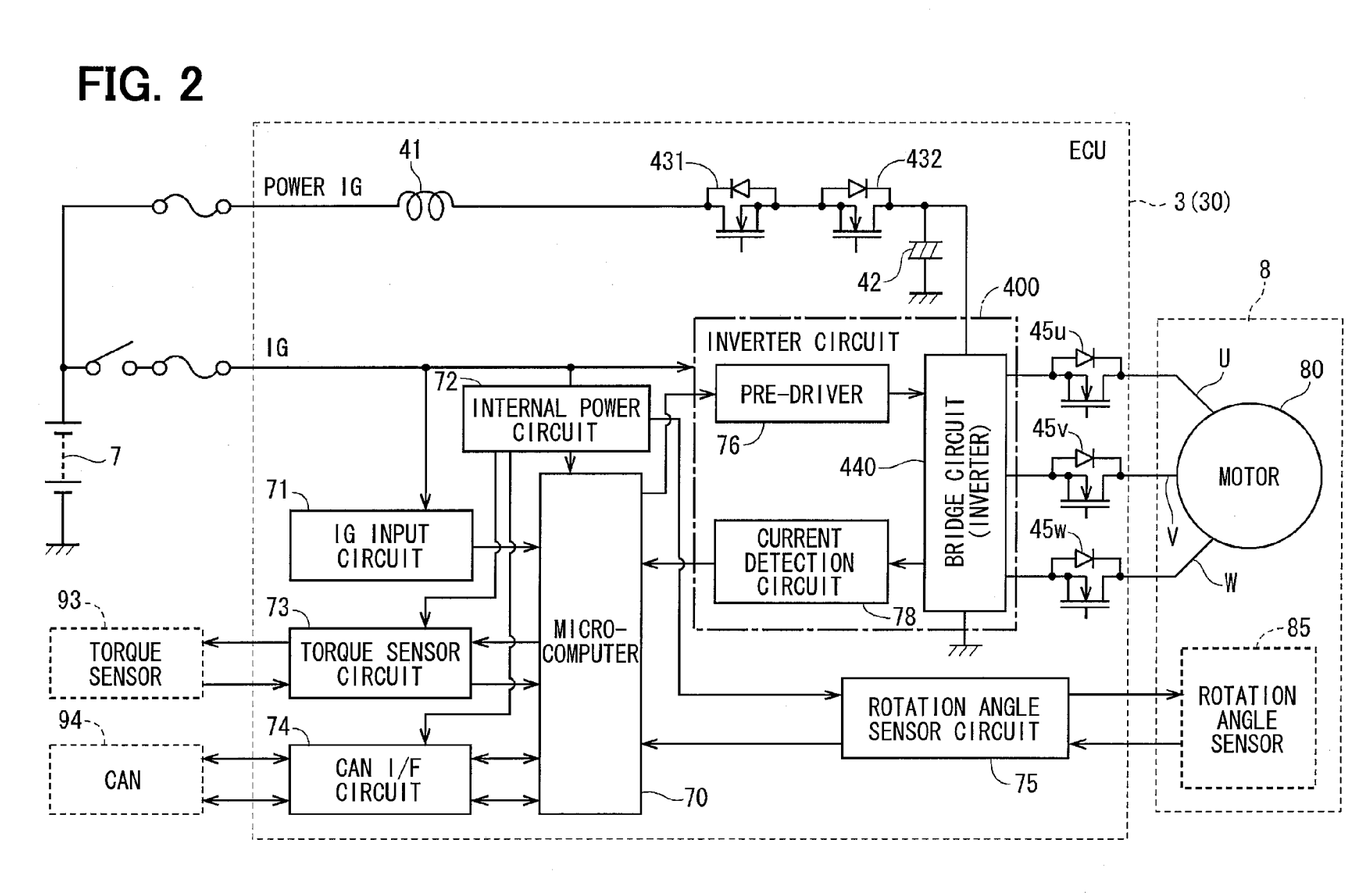
FIG. 2 is a circuit diagram of an ECU used in the embodiment.
Figure 3:
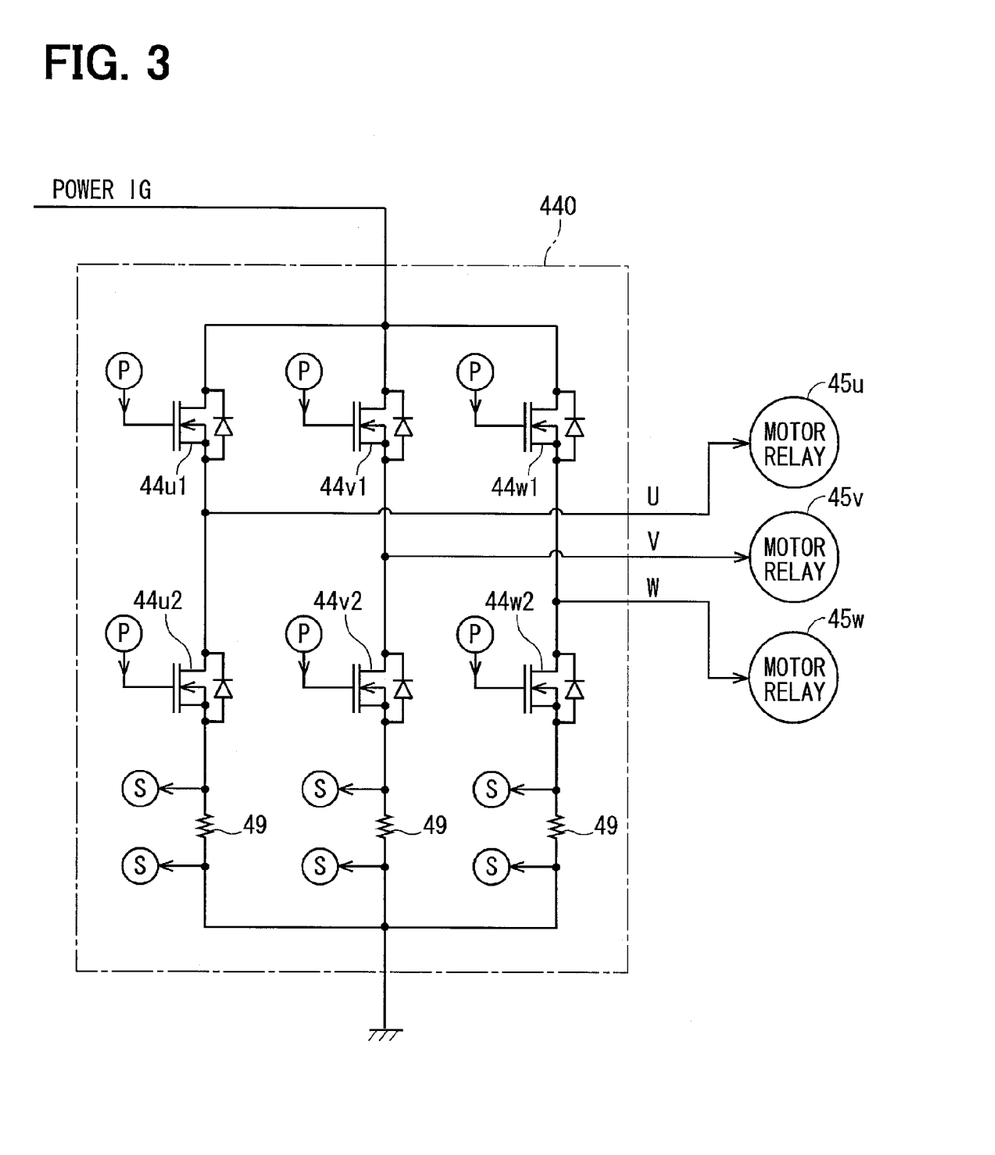
FIG. 3 is a circuit diagram of an inverter in the ECU shown in FIG. 2.

The ECU 3 is configured electrically as shown in FIG. 2 and FIG. 3. As shown in FIG. 2, the ECU 3 is supplied with an electric drive power and a control power from a battery 7 through a power IG bus and an IG bus, respectively.

The power IG bus is provided with a choke coil 41, one or more electrolytic capacitors 42 and metal-oxide-semiconductor filed-effect transistors (FETs) 431, 432 for power supply relays. The choke coil 41 and the electrolytic capacitor 42 form a filter circuit to reduce noises transferred from other devices, which share the battery 7, and noises transferred from the ECU 3 to other devices.

The FETs 431, 432 are connected such that respective parasitic diodes are biased in opposite directions. The two FETs 431, 432 are collectively referred to as a power relay FET 43. The FETs 431, 432 are turned off by commands from a microcomputer 70 to protect a bridge circuit (inverter) 440, when the ECU 3 fails, for example. The FETs 431, 432 also shut off a current, which flows from the bridge circuit 440 to the motor 80.

The control power flowing through the IG bus is supplied to an inverter circuit 400 and also to the microcomputer 70 through an IG input circuit 71 and an internal power circuit 72. The microcomputer 70 controls the inverter circuit 400 in accordance with various input signals related to the steering assist torque. For example, the steering torque signal outputted by the torque sensor 93 is inputted through a torque sensor circuit 73, and the vehicle speed signal of the CAN bus 94 is inputted through a CAN interface circuit 74. The rotation angle signal outputted by the rotation angle sensor 85 in the motor assembly 8 is inputted through a rotation angle sensor circuit 75.

The inverter circuit 400 includes, in addition to the bridge circuit 440 forming high-side and low-side arms of an inverter shown in FIG. 3, an inverter pre-driver 76 and a current detection circuit 76. In FIG. 3, "P" indicates a control signal from the inverter pre-driver 76 and "S" indicates an output signal to the current detection circuit 78.

As shown in FIG. 3, the bridge circuit 440 is formed of six FETs 44$u$1, 44$u$2, 44$v$1, 44$v$2, 44$w$1, 44$w$2 for an inverter and three shunt resistors 49. The FETs 44$u$1, 44$v$1, 44$w$1 are high-side arms, that is, high potential side switching elements, of the U-phase, the V-phase, the W-phase, respectively. The FETs 44$u$2, 44$v$2, 44$w$2 are low-side arms, that is, low potential side switching elements, of the U-phase, the V-phase, the W-phase, respectively. The three FETs for the high-side arms are referred to a FET 441, and the three FETs for the low-side arms are referred to as a FET 442. Further, the FETs 441, 442 for the high-side arm and the low-side arm are referred to as an inverter FET 44. The inverter FET 44 is a power element.

The inverter pre-driver 76 changes the gate voltages of the FETs 441, 442 in response to commands from the microcomputer 70 thereby to switch over on-off state between the source and the drain of the FETs 441, 442. Thus, a motor terminal voltage, which is a voltage developed at a junction between the source of the FET 441 and the drain of the FET 442, is controlled.

The shunt resistor 49 is connected electrically between the FET 442 of the low-side and the ground. The current detection circuit 78 detects a current flowing through the shunt resistor 49 thereby to detect a current supplied to the motor coil of each phase, and feeds back the detected current to the microcomputer 70.

FETs 45$u$, 45$v$, 45$w$ for motor relays are provided in a current supply path of each phase from the bridge circuit 440 to the motor 80 thereby to shut off the current supply to the motor 80 in case of failure and the like. The three motor relay FETs are collectively referred to as a motor relay FET 45.

Figure 4:
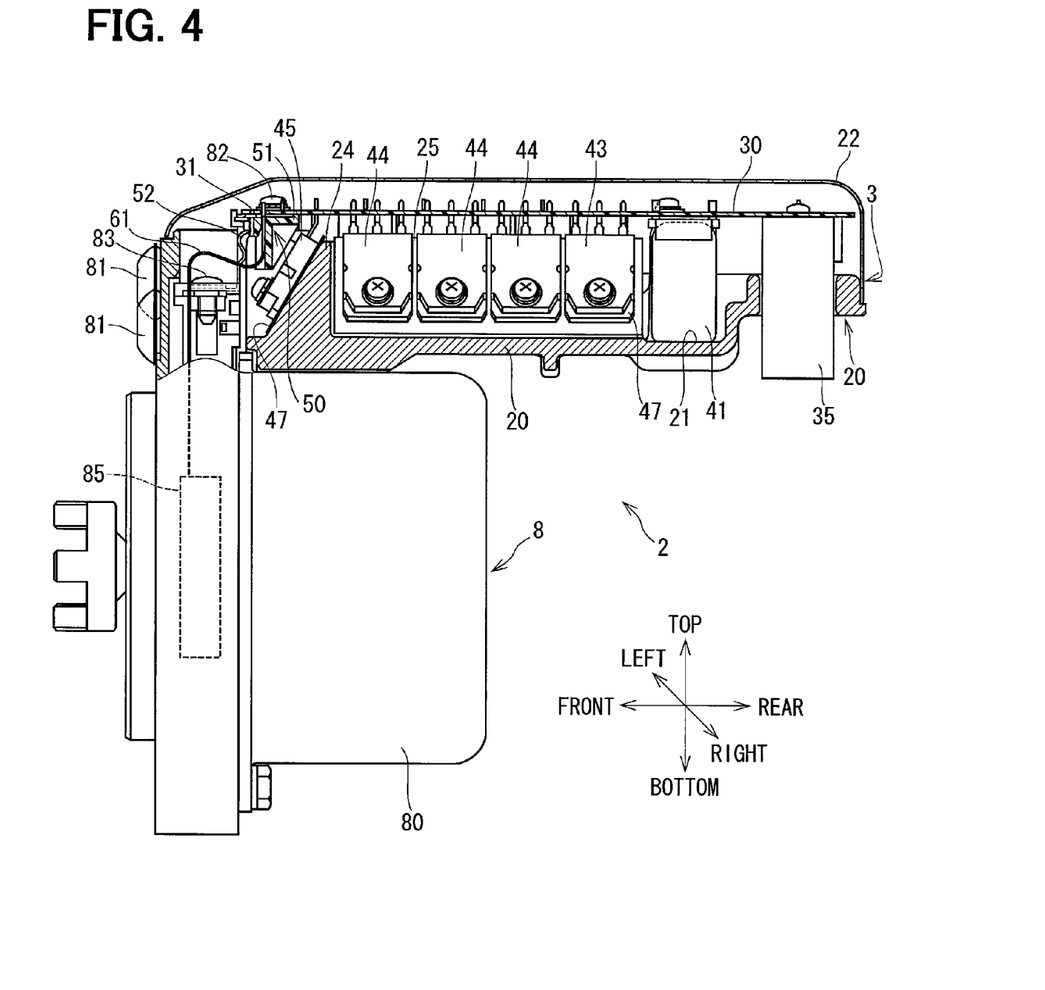
FIG. 4 is a sectional view of the motor drive apparatus shown in FIG. 1.

The motor assembly 2 including the ECU 3 and the motor 8 is configured as shown in FIG. 4 to FIG. 13. The ECU 3 includes a heat sink 20, an electric circuit substrate 30 and a resin member 50. The heat sink 20 is a fixed part. Here, for convenience of description, the upper side and the lower side in FIG. 4 are assumed to correspond to the top side and the bottom side of the ECU 3, respectively. Further, the left side and the right side in FIG. 4 are assumed to correspond to the front side and the rear side of the ECU 3, respectively. Still further, the front surface side and the rear surface side of FIG. 4 are assumed to be the right side and the left side of the ECU 3, respectively.

The heat sink 20 is formed of a heat conductive material such as a metal like aluminum, for example, and has a function of supporting the ECU 20 thereon and a function of absorbing heat generated by the FETs. The heat sink 20 is screw-threaded and fixed to the motor assembly 8 by fixing screws 81.

Figure 5:
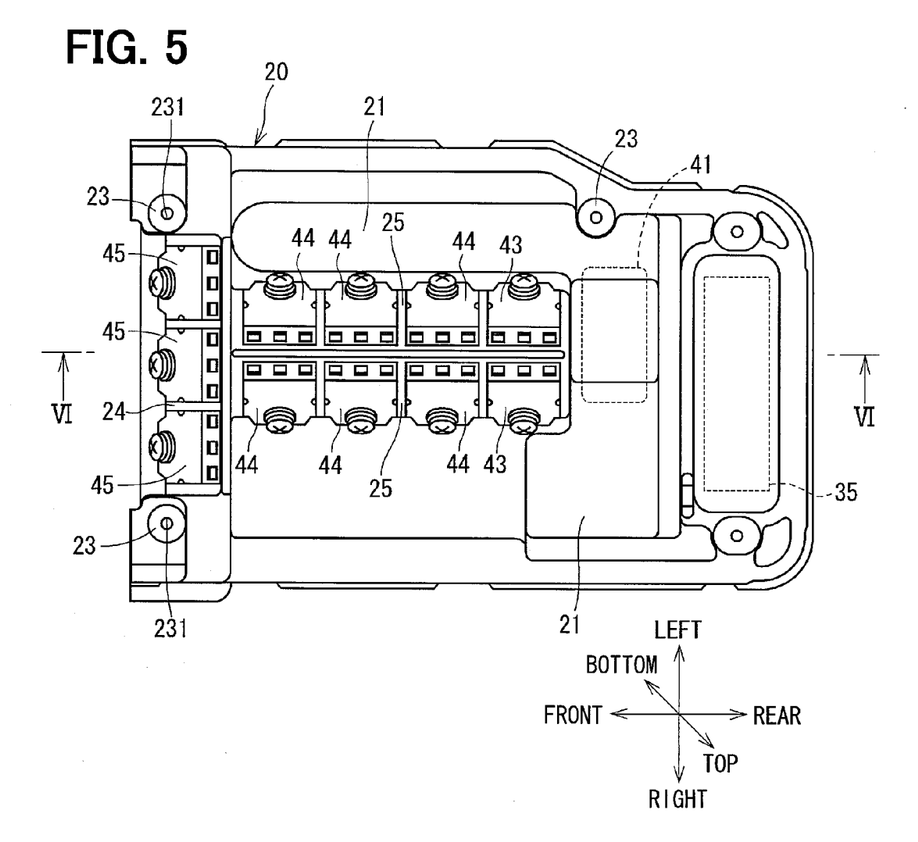
FIG. 5 is a top plan view of a heat sink used in the embodiment.

As shown in FIG. 5, the heat sink 20 has generally a rectangular shape when viewed from the top side. The heat sink 20 has a bottom part 21, which is formed generally in parallel to the substrate 30. A first mounting part 24 and a second mounting part 25, which protrude in the upward direction, are formed on the bottom part 21. The first mounting part 24 is formed to extend longitudinally in the left-right direction at the front side of the heat sink 20. The second mounting part 25 is formed to extend longitudinally in the front-rear direction at generally the left-right center of the heat sink 20. The FET 45 is mounted on a front inclined surface of the first mounting part 24 through an insulating and heat-radiating sheet 47. The inverter FET 44 and the power relay FET 43 are mounted on inclined surfaces at both left and right sides of the second mounting part 25 through the insulting and heat-radiating sheets 47.

The heat sink 20 has a plurality of protrusions 23 formed generally perpendicularly to the bottom part 21. A screw hole 231 is formed on the top surface of each protrusion 23 thereby to fix the substrate 30. That is, as indicated by a dotted line in FIG. 6, the substrate 30 is assembled to the top side of the heat sink 20. A cover 30 is provided at the opposite side of the heat sink 20 relative to the substrate 30.

Figure 6:
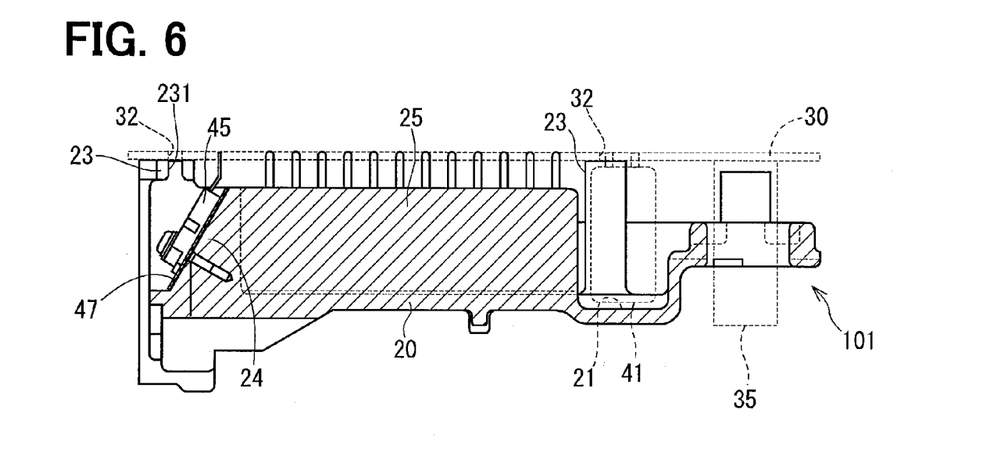
FIG. 6 is a sectional view taken along a line VI-VI in FIG. 5.
Figure 7:
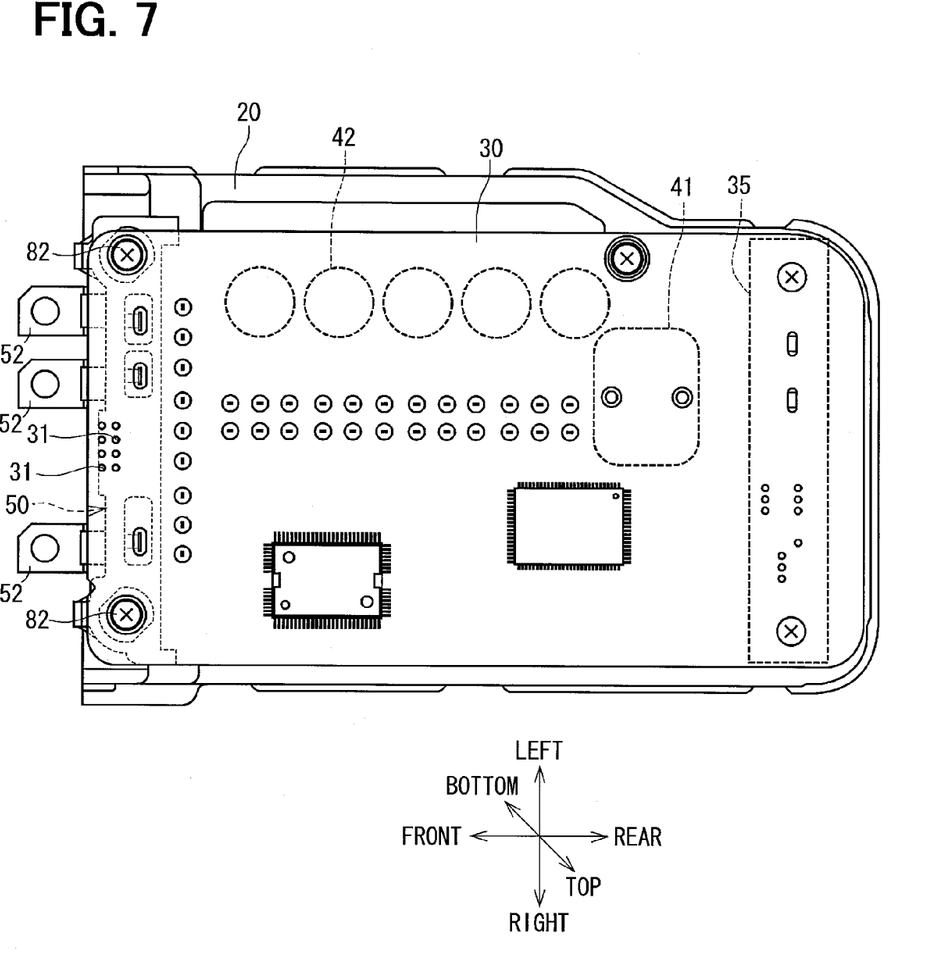
FIG. 7 is a top plan view of a substrate of the ECU in the embodiment.

The substrate 30 is provided above the heat sink 20 as shown in FIG. 4 and FIG. 6. The leads of the FETs 43, 44, 45 are electrically connected to the lower side of the substrate 30. The electrolytic capacitor 42, the choke coil 41 and a connector 35 are mounted on the lower side of the substrate 30 (FIG. 5 and FIG. 7). The microcomputer 70, which controls on-off states of the FETs 43, 44, 45, and the like are mounted on the substrate 30.

As shown in FIG. 7, eight through holes 31 are formed to pass through the substrate 30 in the up-down (top-bottom) direction in the front side of the substrate 30 at the intermediate part in the left-right direction. The eight through holes 31 are divided into two rows in the front-rear direction so that four through holes 31 are arranged in the left-right direction in each row. A rotation angle signal wires 61 connected to the rotation angle sensor 85 is connected electrically to the substrate 30 by soldering or the like to each of the four through holes 31, which are positioned at the rear row of the two rows (FIG. 4). A plurality of substrate holes 32 is also formed in the substrate 30 thereby to fix the substrate 30. The plurality of substrate holes 32 is formed in correspondence to the screw holes 231 of the heat sink 20. Each substrate hole 32 is a through hole.

As shown in FIG. 4, the resin member 50 is positioned between the heat sink 20 and the substrate 30 and at the front side of the ECU 3. The resin member 50 includes a resin mold 51 and three motor terminals 52 for three phases. A top plan view of the resin member 50 is shown in FIG. 8.

Figure 8:
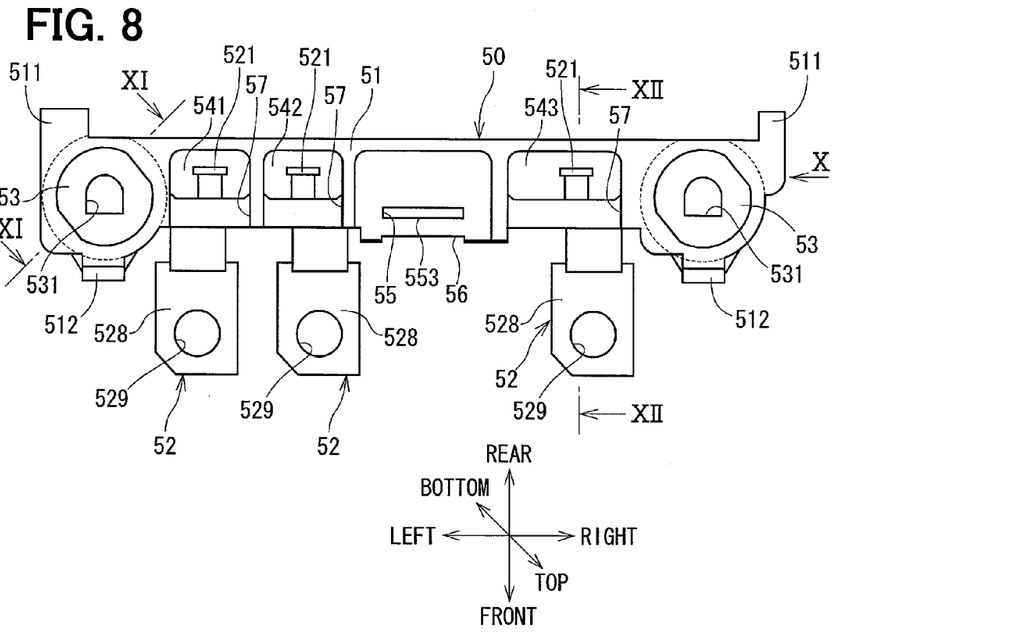
FIG. 8 is a top plan view of a resin member of the ECU in the embodiment.

As shown in FIG. 8, the resin mold 51 is shaped in generally a rectangular bar and has three through holes 541, 542, 543, which are arranged in the left-right direction. The through holes 541, 542, 543 are formed to pass through the resin mold 51 in the up-down direction.

Viewing recesses 57 are formed in the bottom direction in the resin mold 51 at positions, which correspond in position to the through holes 541, 542, 543 provided at the upper side. The viewing recesses 57 are formed to be contiguous with the through holes 541, 542, 543 at the front side of the through holes 541, 542, 543, respectively. Thus the insides of the through holes 541, 542, 543 are visible from the front side of the resin mold 51 through the viewing recesses 57.

Figure 9:
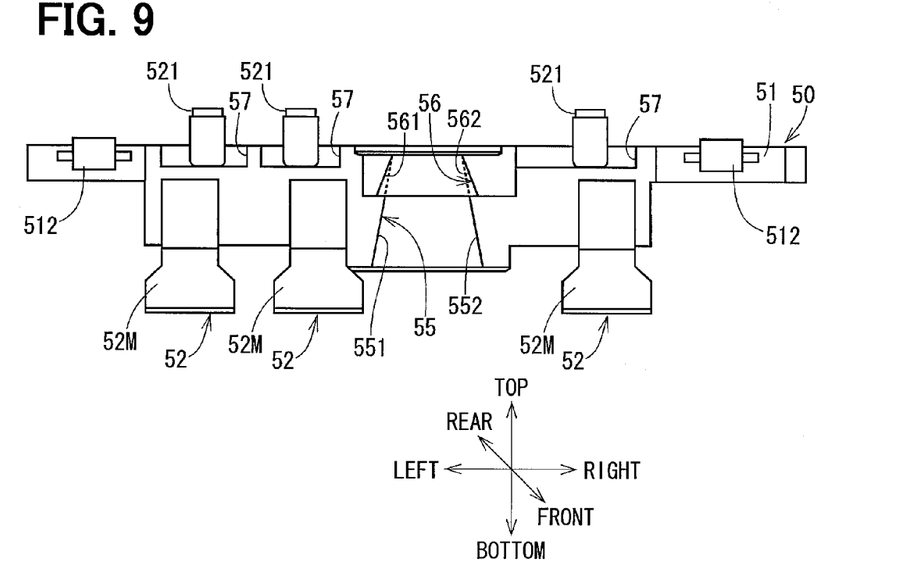
FIG. 9 is a front plan view of the substrate of the ECU in the embodiment.
Figure 10:
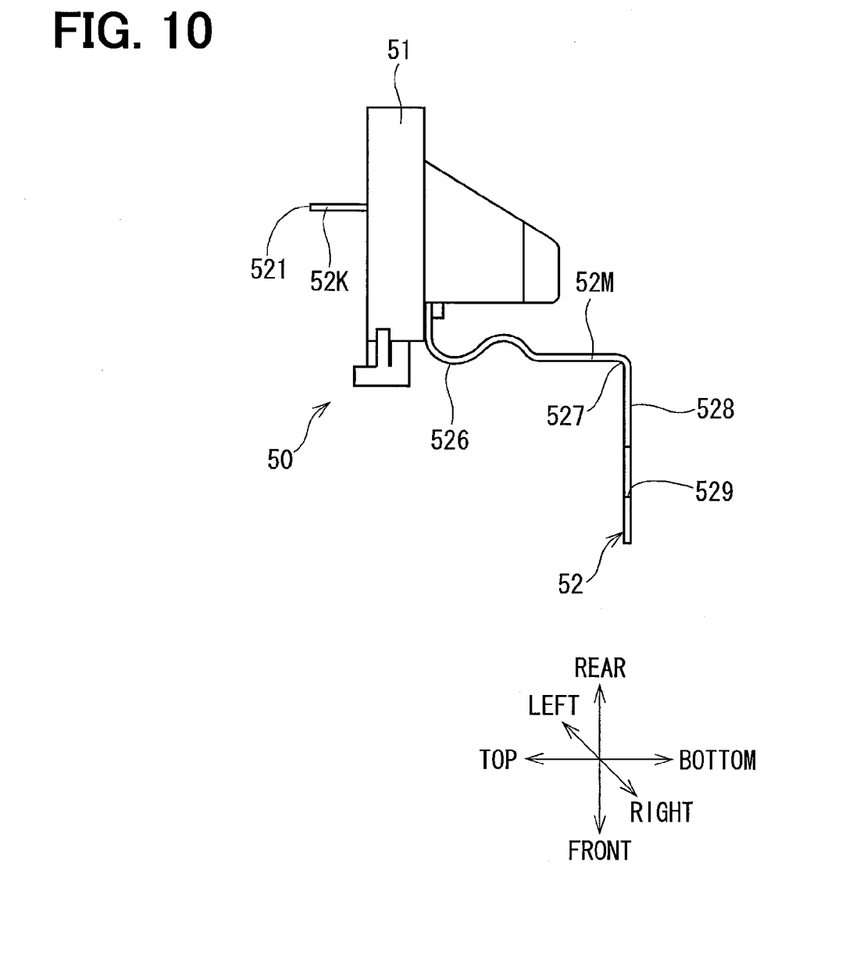
FIG. 10 is a side view of the resin member taken in an arrow direction X in FIG. 8.
Figure 11:
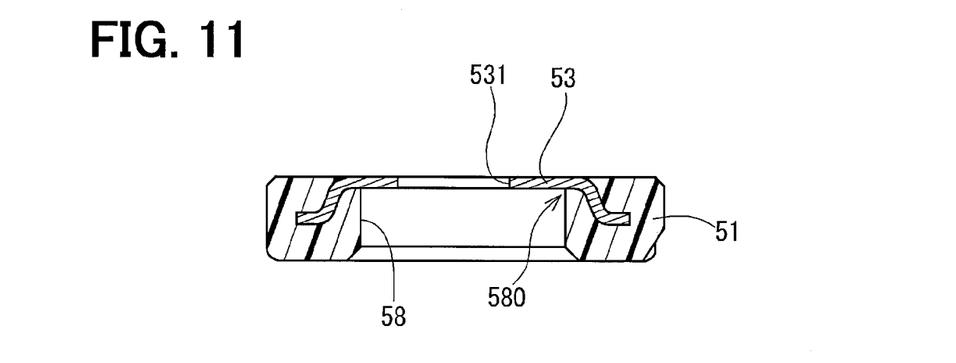
FIG. 11 is a sectional view of a resin mold of the resin member taken along a line XI-XI in FIG. 8.

A guide hole 55 is formed to pass through the resin mold 51 in the up-down direction in the intermediate part in the left-right direction of the resin mold 51. The guide hole 55 is formed between the through holes 541, 542 and the through hole 543 and at the more front side than the through holes 541, 542, 543. The guide hole 55 has a first side wall 551 and a second side wall 552, which are formed in the up-down direction in the resin mold 51 (FIG. 9). The first side wall 551 and the second side wall 552 are formed such that a distance in the left-right direction gradually decreases from the lower side to the upper side. An opening 553 at the upper side of the guide hole 55 is formed to correspond in position to the four through holes 31 at the rear side of the two rows of through holes 31 of the substrate 30.

As shown in FIG. 8 and FIG. 9, a guide groove 56 is formed at the front side of the guide hole 55 of the resin mold 51. A first side wall 561 and a second guide wall 562 of the guide groove 56 at the left side and the right side are formed such that a distance in the left-right direction gradually decreases from the lower side to the upper side (FIG. 9). The guide groove 56 is formed to correspond in position to the four through holes 31 at the front side of the two rows of the through holes of the substrate 30 (FIG. 4). The guide groove 56 has a width, which corresponds to the four through holes 31, in the left-right direction.

The guide hole 55 and the guide groove 56 thus form a guide part. The rotation angle signal wires 61 are guided by the guide hole 55, inserted into the four through holes 31 at the rear side of the two rows of through holes 31 of the substrate 30 and connected electrically to the substrate 30.

Figure 13:
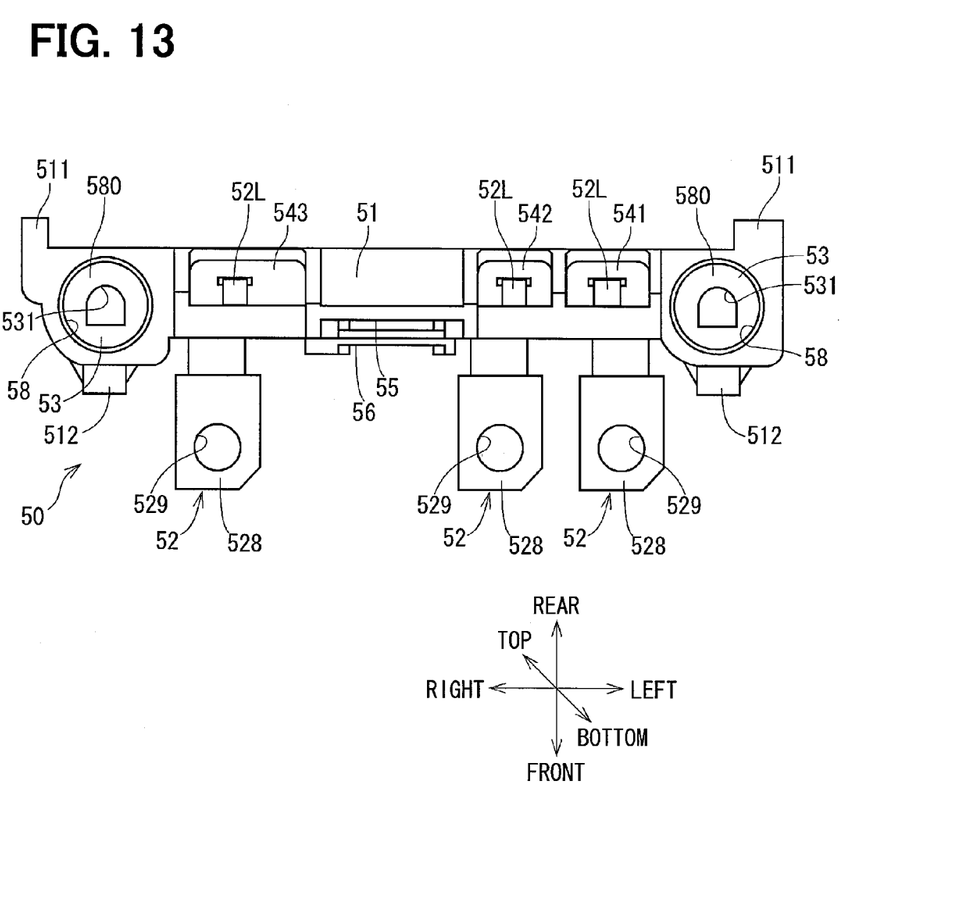
FIG. 13 is a bottom plan view of the resin member used in the embodiment.

Two resin holes 58 are formed at both sides in the left-right direction of the resin mold 51 (FIG. 13). Each resin hole 58 is formed to pass through the resin mold 51 in the up-down direction. A metal part 53 is provided at a position, which corresponds in position to the resin hole 58 of the resin mold 51. The metal part 53 is molded in the resin mold 51 such that the resin mold 51 covers the upper side of the resin hole 58. A generally semi-circular metal hole 531 is formed in the central part of each metal part 53. The resin hole 58 and the metal part 53 form a fitting recess 580. The metal hole 531 corresponds to the through hole of the resin member 50.

The fitting recess 580 can be fit with the protrusion 23 of the heat sink 20. The metal hole 531 of the metal part 53 is formed to correspond in position to the substrate hole 32 of the substrate 30 and a screw hole 231 of the heat sink 20. The substrate 30 and the resin member 50 are tightened together with the heat sink 20 by passing the screw 82 through the substrate hole 32 and the metal hole 531 and threading the same into the screw hole 231. Thus the substrate 30 and the resin member 50 are fixed to the heat sink 20 (FIG. 7). By fixing the substrate 30 and the resin member 50 to the heat sink 20, the metal part 53 tightly contacts the substrate 30 and the heat sink 30.

At both sides in the left-right direction of the resin mold 51, two first nails 511 and two second nails 512 are formed. The first nails 511 protrude in the rear direction and the second nails 512 protrude in the front direction.

Figure 12:
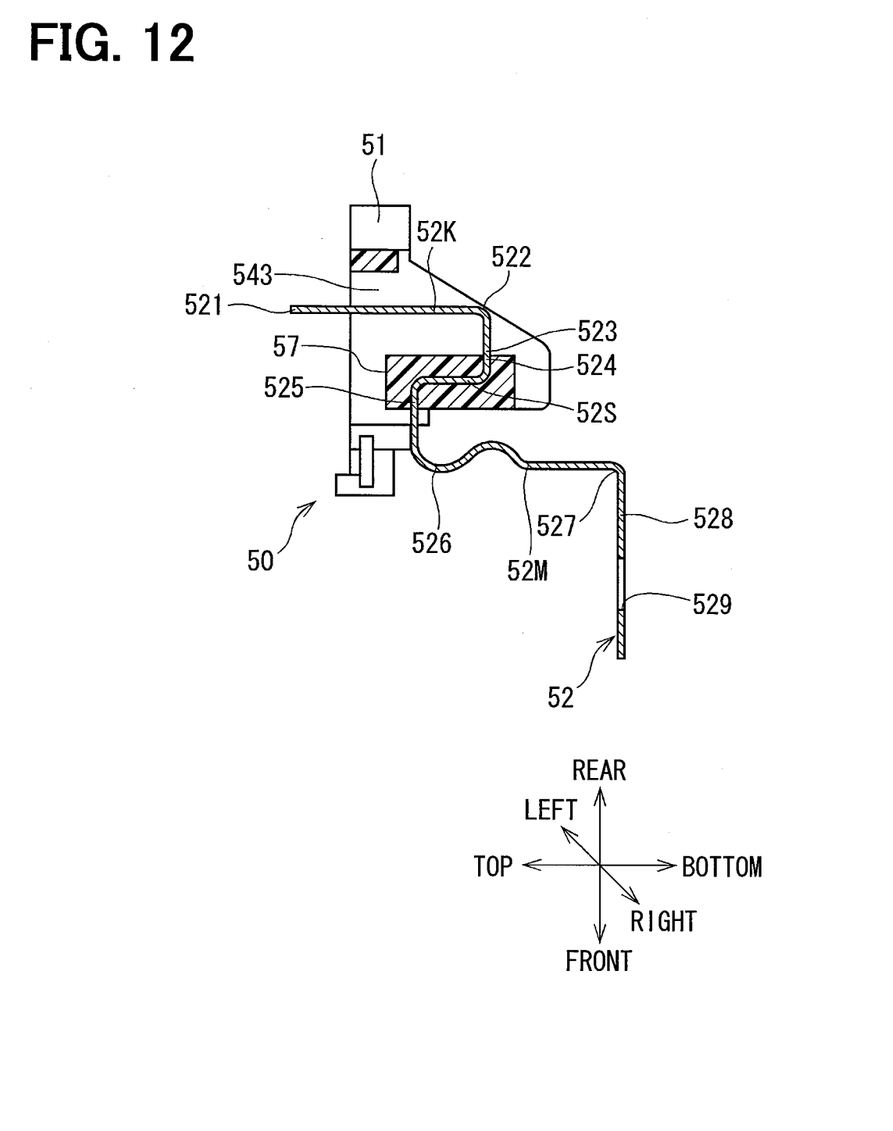
FIG. 12 is a sectional view of the resin member taken along a line XII-XII in FIG. 8.

The motor terminal 52 is formed to have, as shown in FIG. 12, an embedded part 52S, a substrate-side exposed part 52K and a motor-side exposed part 52M. The embedded part 52S is molded in the resin mold 51 to be held thereby. The substrate-side exposed part 52K is exposed toward the substrate 30 side. The motor-side exposed part 52M is exposed toward the motor assembly 8 side.

The embedded part 52S is generally S-shaped. The embedded part 52S has a substrate-side mold end 524 and a motor-side mold end 525. The substrate-side mold end 524 connects to the substrate-side exposed part 52K. The motor-side mold end 525 connects to the motor-side exposed part 52M. The embedded part 52S is molded in the resin mold 51 such that the motor-side mold end 525 is located at the upper position than the substrate-side mold end 524.

The substrate-side exposed part 52K is accommodated in the through holes 541, 542, 543 and has a resin-side end 523, a first bent part 522 and a substrate connection part 521. The resin-side end 523 is contiguous with the substrate-side mold end 524 of the embedded part 52S. The first bent part 522 is formed to be distanced from the resin-side end 523 in the front-rear direction and bent 90 degrees in the upward direction. The substrate connection part 521 is formed to be distanced from the first bent part 522 in the up-down direction. The substrate connection part 521 is electrically connectable to the substrate 30 and electrically connected to the substrate 30 by, for example, soldering. The substrate-side exposed part 52K is L-shaped such that a distance in the up-down direction between the substrate connection part 521 and the first bent part 522 is longer than a distance in the front-rear direction between the first bent part 522 and the resin-side end 523.

The motor-side exposed part 52M has a curved part 526, a second bent part 527 and a motor connection part 528. The curved part 526 is electrically connected to a motor-side mold end 525 of the embedded part 52S. The curved part 526 is formed to be distanced from the motor-side mold end 525 of the embedded part 52S in the front-rear direction and curved in the up-down direction in a wave form. The second bent part 527 is shaped to be distanced from the curved part 526 in the up-down direction and bent 90 degrees in the front direction. The motor connection part 528 is formed at more front side than the second bent part 527 and has a connection hole 529, which passes through the motor connection part 528 in the up-down direction. The motor terminal 52 is electrically connected to the motor 80 by threading the screw 83 into the connection hole 529 and screw-tightening the motor connection part 528 to the motor assembly 8.

In operation of the motor drive apparatus according to the embodiment described above, the microcomputer 70 of the ECU 3 controls on-off state of the inverter FET 44 through the inverter pre-driver 67 of the inverter circuit 400 in accordance with the input signals of the steering torque, the vehicle speed and the motor rotation angle as well as the motor current detection signal and the like. The inverter circuit 400 thus converts the DC power supplied from the battery 7 through the power relay FET 43 into the three-phase AC power and supplies the AC power to the motor 80 of the motor assembly 8 through the motor terminals 52. The rotation output of the motor assembly 8 is transferred to the steering shaft 92 through the reduction gear 89 to thereby assist the steering operation of a driver.

The embodiment described above provides the following advantages (1) to (9).

(1) The resin member 50 and the substrate 30 are tightened together and fixed to the heat sink 20. Thus, positioning of the resin member 50 and positioning of the substrate 30 can be attained at the same time. The assembling work is improved to be simple.

(2) The resin member 50 has the metal part 53, which tightly contacts the heat sink 20 and the substrate 30. The heat of the substrate 30 can thus be transferred to the heat sink 20 through the metal part 53 and then radiated outward by the heat sink 20. The heat radiation from the ECU 3 can be enhanced.

(3) The resin member 50 has the fitting recess 580, which is fitted with the protrusion 23 of the heat sink 20. Since the fitting recess 580 and the protrusion 23 of the heat sink 20 are fitted to each other, the positional deviation of the resin member 50 relative to the heat sink 20 is reduced.

(4) The substrate-side exposed part 52K of the motor terminal 52 is shaped like a letter "L." The substrate-side exposed part 52K is thus shaped such that the substrate connection part 521 and the resin mold 51 are distanced. The resin mold 51 is protected from deforming due to heat of soldering, in case of connecting the substrate connection part 521 to the substrate 30 by soldering for example.

(5) The motor-side exposed part 52M of the motor terminal 52 has the curved part 526, which is formed to be wavy in the up-down direction. As a result, the curved part 526 reduces stress generated at the time of tightening the screw 83 when the motor-side exposed part 52M is fixed to the motor assembly 8 by the screws 83. The curved part 526 also reduces transfer of vibrations.

(6) The embedded part 52S is molded in the resin mold 51 such that the motor-side mold end 525 is positioned at more upper side than the substrate-side mold end 524. By thus lengthening the distance between the substrate connection part 521 and the resin-side end 523, deformation of resin due to soldering heat is reduced. By lengthening the curved part 526, stress caused by tightening screws and transfer of vibrations can be reduced.

(7) The resin member 50 has the two first nails 511 protruding in the rear direction and the two second nails 512 protruding in the front direction. The resin member 50 thus can be positioned readily relative to the heat sink 20 and the substrate 30 by, for example, abutting a jig to the first nails 511 and the second nails 512 at the time of assembling. The assembling work can be improved.

(8) The resin member 50 has the guide groove 56 formed in correspondence to the through holes 31, which are a part of the plurality of through holes 31 of the substrate 30 and provided at the front side. Thus the rotation angle signal wires 61 can be guided to the through holes 31 of the substrate 30. Hence the rotation angle signal wires 61 and the through holes 31 can be connected readily. The resin member 50 further has the guide hole 55 formed in correspondence to the through holes 31, which are a part of the plurality of through holes 31 of the substrate 30 and provided as extra holes at the rear side. When the motor assembly 8 or the ECU 3 is replaced with a new unit for example, the rotation angle signal wires 61 can be connected to the through holes 31 provided as the extra holes.

(9) The resin member 50 has the viewing recesses 57, which are contiguous with the through holes 541, 542, 543. After connecting the substrate connection part 521 and the substrate 30, the position of terminal connection between the substrate connection part 521 and the substrate 30 can be viewed through the viewing recesses 57. Thus, the state of connection of the motor terminals 52 and the substrate 30 can be confirmed. As a result, insufficient connection between the motor terminals 52 and the substrate 30 can be eliminated, and the assembling work can be improved further.

Other Embodiments

The motor drive apparatus according to the embodiment may be applied to not only the brushless motor but also to a motor with brushes. The motor drive apparatus described above is not limited to the EPS system, but may be applied to other uses of motors. The rotation angle sensor is not limited to the resolver, but may be a Hall element and the like.

The metal part may be formed in a nail shape and inserted into a resin hole. The metal part may be fixed by crimping into the resin hole. The rotation angle signal wires may be connected to the substrate by a connector or welding.

The motor terminals may be connected to the motor by welding and the like. The rotation angle signal line wires may be guided by a plurality of guide holes.

The motor drive apparatus described above may be implemented in other embodiments.

What is claimed is:

1. A motor drive apparatus comprising:
   a substrate, to which power elements are electrically connected to generate outputs for driving a motor;
   a fixed member having a plurality of screw holes for fixing the substrate; and
   a resin member provided between the fixed member and the substrate and having a plurality of motor terminals and a resin mold, the motor terminals electrically connecting the motor and the substrate, and the resin mold integrally fixing the motor terminals by molding an intermediate part of each of the motor terminals,
   wherein each of the motor terminals has an embedded part molded in the resin member, a substrate-side exposed part exposed to a substrate side and a motor-side exposed part exposed to a motor side,
   wherein the resin member and the substrate have through holes in correspondence to the screw holes of the fixed member and are tightened together to be fixed to the fixed member, and
   wherein the fixed member and the substrate have an additional screw hole and an additional through hole, respectively, in correspondence to each other to be fixed to each other at a position separated from the resin member.

2. The motor drive apparatus according to claim 1, wherein:
   the resin mold further has metal parts molded therein; and
   the through holes of the resin member are formed in the metal parts, respectively.

3. The motor drive apparatus according to claim 1, wherein:
   the screw holes of the fixed member are formed on protrusions protruding in a direction of a screw axis, respectively; and
   the through holes of the resin member are formed in recesses in the direction of the screw axis to allow the protrusions to be fitted in the recesses.

4. The motor drive apparatus according to claim 1, wherein:
   the substrate-side exposed part of the motor terminal is bent in an L-shape and electrically connected to the substrate.

5. The motor drive apparatus according to claim 1, wherein:
   the motor-side exposed part of the motor terminal has a curved part formed to curve in a wavy form.

6. The motor drive apparatus according to claim 1, wherein:
   the embedded part of the motor terminal has a substrate-side mold end contiguous with the substrate-side exposed part, and a motor-side mold end contiguous with the motor-side exposed part; and the motor-side mold end is formed at a position that is closer to the substrate side than the substrate-side mold end in a direction perpendicular to the substrate.

7. The motor drive apparatus according to claim 1, wherein:

the resin member has a plurality of nails protruding in a direction, in which the substrate-side exposed part of the motor terminal protrudes.

8. The motor drive apparatus according to claim 1, wherein:

the resin member has a plurality of nails protruding in a direction, in which the motor-side exposed part of the motor terminal protrudes.

9. The motor drive apparatus according to claim 1, wherein:

the resin member has a guide part for guiding rotation angle signal wires, which connect electrically the substrate and a rotation angle sensor, which is provided in the motor to detect a rotation angle of the motor.

10. The motor drive apparatus according to claim 9, wherein:

the guide part is formed at a plurality of positions.

11. The motor drive apparatus according to claim 1, wherein:

the resin member has a viewing recess recessed toward the fixed member at a terminal connection position where the substrate-side exposed part of the motor terminal and the substrate are connected, thereby to allow the terminal connection position to be viewed from an external side.

12. The motor drive apparatus according to claim 1, wherein:

the resin member is provided along one side end of the substrate.

* * * * *